(12) United States Patent
Park et al.

(10) Patent No.: US 9,254,805 B2
(45) Date of Patent: Feb. 9, 2016

(54) SYSTEM AND METHOD FOR DEPLOYING SIDE AIRBAG OF VEHICLE

(71) Applicants: Hyundai Motor Company, Seoul (KR); Kia Motors Corporation, Seoul (KR)

(72) Inventors: Hyung Wook Park, Seoul (KR); Sung Soo Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/460,990

(22) Filed: Aug. 15, 2014

(65) Prior Publication Data

US 2015/0145236 A1    May 28, 2015

(30) Foreign Application Priority Data

Nov. 26, 2013  (KR) .................. 10-2013-0144237

(51) Int. Cl.
*B60R 21/0132* (2006.01)
*B60R 21/0136* (2006.01)

(52) U.S. Cl.
CPC .................................. *B60R 21/0136* (2013.01)

(58) Field of Classification Search
CPC ............... B60R 21/0132; B60R 2021/0009; B60R 2021/01034; B60R 2021/01322; B60R 21/0136
See application file for complete search history.

(56) References Cited

U.S. PATENT DOCUMENTS

| | | | | |
|---|---|---|---|---|
| 5,262,949 A | * | 11/1993 | Okano et al. ................. 701/46 |
| 5,382,049 A | * | 1/1995 | Hiramitsu et al. ............ 280/735 |
| 5,431,441 A | * | 7/1995 | Okano ........................... 280/735 |
| 5,504,379 A | * | 4/1996 | Mazur et al. ................. 307/10.1 |
| 5,702,124 A | * | 12/1997 | Foo et al. ...................... 280/735 |
| 5,815,393 A | * | 9/1998 | Chae .............................. 701/39 |
| RE36,122 E | * | 3/1999 | Mattes et al. ................ 180/268 |
| 5,969,599 A | * | 10/1999 | Wessels et al. .............. 340/436 |
| 6,196,578 B1 | * | 3/2001 | Iyoda ............................ 280/735 |
| 6,246,937 B1 | * | 6/2001 | Miyaguchi et al. ............ 701/45 |
| 6,282,474 B1 | * | 8/2001 | Chou et al. ..................... 701/45 |
| 6,363,306 B1 | * | 3/2002 | Palmertz et al. ............... 701/45 |
| 6,371,515 B1 | * | 4/2002 | Fujishima et al. ........... 280/735 |
| 6,430,489 B1 | * | 8/2002 | Dalum ............................ 701/45 |
| 6,529,810 B2 | * | 3/2003 | Foo et al. ....................... 701/45 |
| 6,549,836 B1 | * | 4/2003 | Yeh et al. ....................... 701/45 |
| 6,714,847 B2 | * | 3/2004 | Ota ................................. 701/46 |
| 6,781,511 B2 | * | 8/2004 | Ota ............................... 340/436 |
| 6,837,516 B2 | * | 1/2005 | Miyata et al. ................. 280/735 |

(Continued)

FOREIGN PATENT DOCUMENTS

| | | |
|---|---|---|
| KR | 100116127 B1 | 6/1997 |
| KR | 10-2005-0080786 A | 8/2005 |
| KR | 10-2006-0033824 A | 4/2006 |

(Continued)

*Primary Examiner* — Laura Freedman
(74) *Attorney, Agent, or Firm* — McDermott Will & Emery LLP

(57) ABSTRACT

A system for deploying a side airbag of a vehicle comprises a front/side airbag controller for controlling processes of deploying a front airbag and a side airbag independently. The front/side airbag controller comprises a front signal monitoring unit converting a front acceleration signal received from the airbag controller into a speed according to time and then determining whether or not the speed according to time exceeds a first threshold. A threshold adjustment unit receives a threshold adjustment request signal from the front signal monitoring unit to lower a second threshold that is a threshold with respect to decision factors for deploying the side airbag.

8 Claims, 6 Drawing Sheets

(56) References Cited

U.S. PATENT DOCUMENTS

| | | | |
|---|---|---|---|
| 6,892,122 B2 * | 5/2005 | Miyata et al. | 701/45 |
| 7,162,343 B2 * | 1/2007 | Subbian et al. | 701/45 |
| 7,243,944 B2 * | 7/2007 | Imai et al. | 280/735 |
| 7,618,058 B2 * | 11/2009 | Harase et al. | 280/735 |
| 7,797,091 B2 * | 9/2010 | Inoue et al. | 701/45 |
| 8,165,761 B2 * | 4/2012 | Yoshida | 701/46 |
| 8,463,503 B2 * | 6/2013 | Kang et al. | 701/46 |
| 2008/0046148 A1 * | 2/2008 | Hayashi | B60R 21/0132 701/45 |

FOREIGN PATENT DOCUMENTS

| | | |
|---|---|---|
| KR | 10-2007-0010182 A | 1/2007 |
| KR | 10-2011-0037441 A | 4/2011 |
| KR | 10-2012-0071995 A | 7/2012 |
| KR | 10-2013-0061249 A | 6/2013 |

* cited by examiner

SYSTEM AND METHOD FOR DEPLOYING SIDE AIRBAG OF VEHICLE

CROSS-REFERENCE TO RELATED APPLICATION

This application claims under 35 U.S.C. §119(a) the benefit of priority to Korean Patent Application No. 10-2013-0144237 filed on Nov. 26, 2013, the entire contents of which are incorporated herein by reference.

TECHNICAL FIELD

The present disclosure relates to a system and method for deploying a side airbag of a vehicle. More particularly, the present disclosure relates to a system and method for deploying a side airbag of a vehicle, which can prevent an injury of a passenger by lowering a threshold for deploying the side airbag based on a front acceleration signal upon crash.

BACKGROUND

Generally, airbags are deployed to prevent injury of passengers upon crash of vehicles, which include front airbags including a driver airbag and a passenger airbag and a side (curtain) airbag that is deployed upon a side crash.

Referring to FIG. 1, an airbag deploying system includes a front crash sensor 16 disposed on a vehicle bumper, i.e., a side member or Front End Module (FEM) to sense a front crash with an acceleration signal. A side crash sensor 12 is disposed on a side part of a vehicle body to sense a side crash with an acceleration signal, and a side pressure sensor 14 senses the side crash with a pressure signal. An airbag control unit 10 controls the deploying of a driver airbag 30 or a passenger airbag 32 based on the sensed signal of the front crash sensor 16, or controls the deploying of a side airbag based on the sensed signals of the side crash sensor 12 and the side pressure sensor 14.

In this case, the front crash sensor 16 and the side crash sensor 12 are not separately provided but are mounted in the airbag control unit 10 to sense an acceleration of longitudinal direction (ACU-X) and a lateral direction (ACU-Y).

Accordingly, based on signals of the side pressure sensor 14, the front crash sensor 16, and the side crash sensor 12, the airbag control unit 10 controls the deploying of the driver airbag 30, the passenger airbag 32, or the side airbag.

When the sensed signal ACU-Y (the thick line in FIG. 2A) of the airbag control unit is larger than a threshold (the dotted line in FIG. 2A), and the sensed signal (SIS LHY) of the side crash sensor, or the sensed signal (the thick line in FIG. 2B) of the side pressure sensor is larger than a threshold (the dotted line in FIG. 2B), the side airbag is deployed at a certain deploying point ($T_{FIRE}$).

Although this airbag deploying system is mounted in a vehicle, due to a small magnitude of signals sensed from local crashes of various angles and speeds from actual crash accidents, the side airbag may not be deployed, thus causing damage or an injury to a vehicle body and a passenger.

In other words, since a direct impact is not applied in a lateral direction of a vehicle body in case of local front crashes occurring at various angles, the sensed signal ACU-Y of a side airbag control unit and the sensed signal values of the side crash sensor and the side pressure sensor are indicated as signal values (thin lines in FIGS. 2A and 2B) that cannot exceed the threshold. In spite of a situation in which the side airbag in addition to the front airbag needs to be deployed, the side airbag may not be deployed, thus causing deformation of a vehicle body and injury of passengers.

Thus, in the typical airbag deploying system, upon local front crashes at various angles, although both front and side airbags need to be deployed to protect passengers, only the front airbag is deployed by sensing an X-direction (traveling direction) of the vehicle. In this case, since a direction impact is not applied in the lateral direction of the vehicle body, the sensed values of the Y-direction acceleration and pressure do not exceed a predetermined threshold, making it impossible to deploy the side airbag, and thus causing deformation of the vehicle body and injury of passengers.

The above information disclosed in this Background section is only for enhancement of understanding of the background of the disclosure, and therefore, it may contain information that does not form the prior art that is already known in this country to a person of ordinary skill in the art.

SUMMARY OF THE DISCLOSURE

The present disclosure provides a system and method for deploying a side airbag for a vehicle, which can prevent an injury of a passenger, by lowering a threshold for deploying of the side airbag simultaneously when the speed exceeds the threshold based on an acceleration signal of a longitudinal direction (ACU-X) of the vehicle in an airbag control unit to deploy both front airbag and side airbag, upon local crashes of various angles and speeds occurring in a field, and thus allowing the side airbag to be deployed when a signal sensed by a side crash sensor or a side pressure sensor exceeds the lowered threshold even though the magnitude of the sensed signal is small.

According to an exemplary embodiment of the present disclosure, a system for deploying a side airbag for a vehicle comprises a front/side airbag controller for controlling processes of deploying a front airbag and a side airbag independently. The front/side airbag controller comprises a front signal monitor converting a front acceleration signal received from the airbag controller into a speed according to time and then determining whether or not the speed according to time exceeds a first threshold. A threshold adjuster receives a threshold adjustment request signal from the front signal monitor to lower a second threshold that is a threshold with respect to decision factors for deploying the side airbag.

According to another exemplary embodiment of the present disclosure, a method for deploying a side airbag for a vehicle comprises monitoring a front acceleration signal from a front crash. It is determined whether or not to adjust a threshold of a decision factor for deploying the side airbag based on the front acceleration signal. The threshold of the decision factor is lowered when the threshold of the decision factor needs to be adjusted. The decision factor is converted into a speed value according to time, and then, the speed value is compared with a second threshold to deploy the side airbag when the speed value exceeds the second threshold.

The step of determining whether or not to adjust the threshold may include converting the front acceleration signal into the speed according to time and then determining whether or not the speed according to time exceeds a predetermined threshold according to time.

The step of determining whether or not to adjust the threshold may further include requesting a threshold adjustment request signal from a threshold adjuster when the speed according to time exceeds the predetermined threshold according to time.

The step of lowering the threshold of the decision factor may include lowering the second threshold according to time with respect to a Y-direction acceleration sensed signal value, a sensed signal value of a side crash sensor, and a sensed signal value of a side pressure sensor which are decision factors for deploying the side airbag.

The step of lowering the second threshold may be controlled not to be lowered under a base threshold to prevent the side airbag from mis-deploying.

The second threshold may increase to an original value when the speed according to time again becomes smaller than the first threshold even though the second threshold with respect to the decision factors for deploying the side airbag is lowered since the speed according to time converted from the front acceleration signal exceeds the first threshold.

Other aspects and exemplary embodiments of the disclosure are discussed infra.

BRIEF DESCRIPTION OF THE DRAWINGS

The above and other features of the present disclosure will now be described in detail with reference to certain exemplary embodiments thereof illustrated by the accompanying drawings which are given hereinbelow by way of illustration only, and thus are not limitative of the present disclosure.

Figure 1:
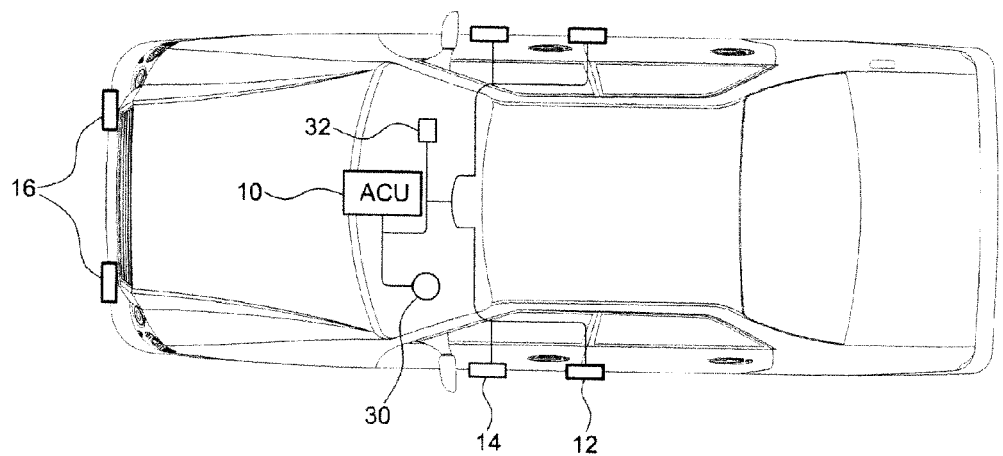
FIG. 1 is a view illustrating a configuration of a system for deploying front and side airbags.
Figure 2A:
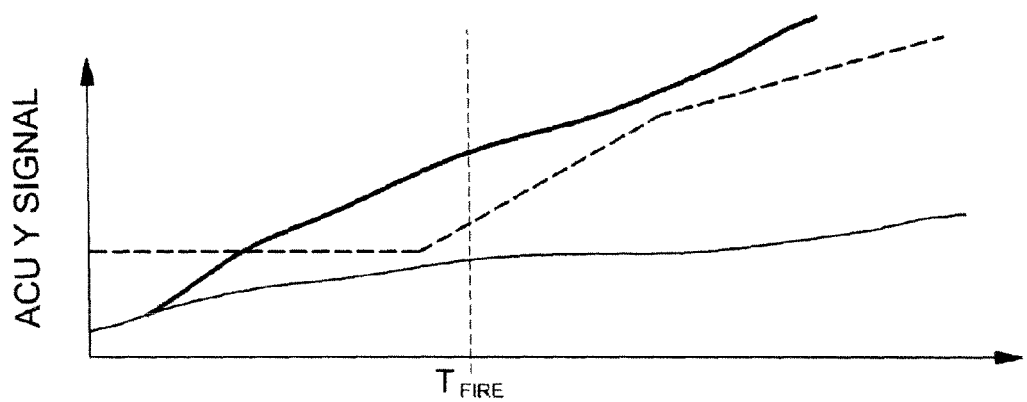
FIG. 2A is a graph illustrating a typical side airbag deploying method.
Figure 2B:
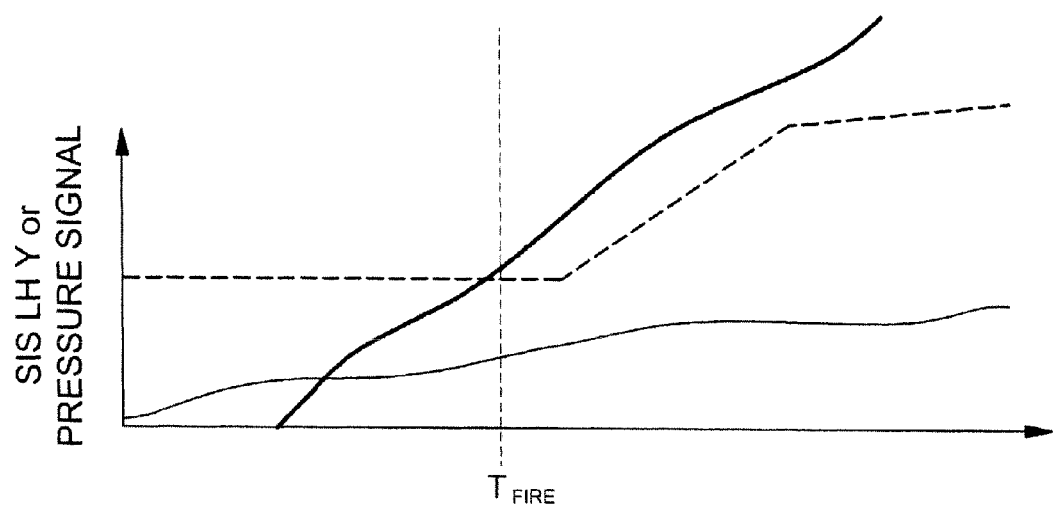
FIG. 2B is a graph illustrating a typical side airbag deploying method.

It should be understood that the accompanying drawings are not necessarily to scale, presenting a somewhat simplified representation of various exemplary features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents, and other embodiments, which may be included within the spirit and scope of the disclosure as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed infra.

Hereinafter, exemplary embodiments of the present disclosure will be described in detail with reference to the accompanying drawings so that those skilled in the art can easily carry out the present disclosure.

Figure 3:
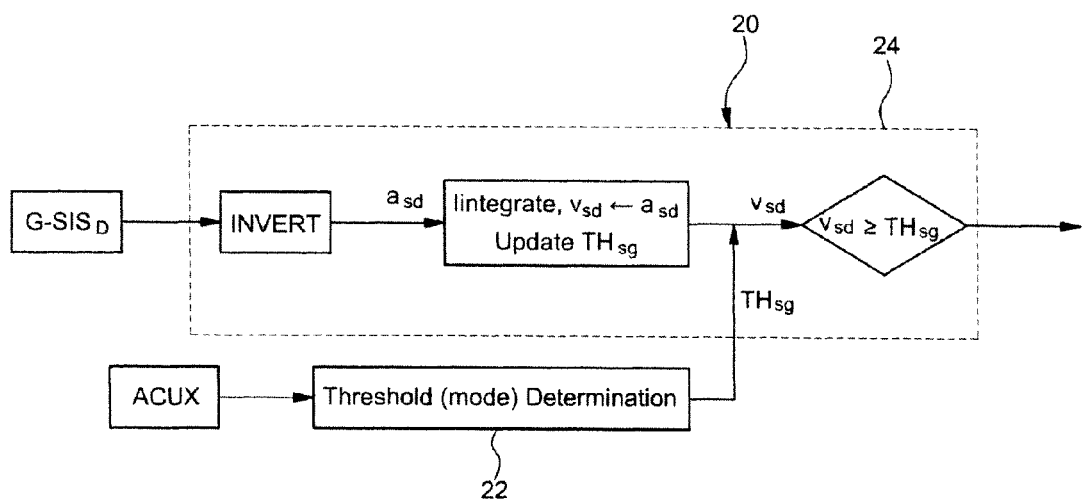
FIG. 3 is a view illustrating a side airbag deploying system for a vehicle according to an embodiment of the present disclosure.
Figure 4:
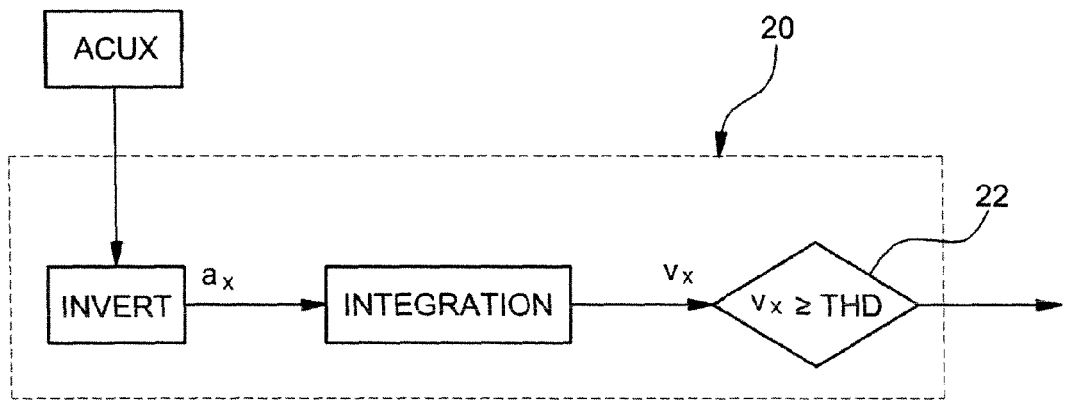
FIG. 4 is a view illustrating a front signal monitor of a side airbag deploying system for a vehicle according to an embodiment of the present disclosure.

FIG. 3 is a view illustrating a side airbag deploying system for a vehicle according to an embodiment of the present disclosure, and FIG. 4 is a view illustrating a front signal monitor of a side airbag deploying system for a vehicle according to an embodiment of the present disclosure.

When a front airbag deploying algorithm and a side airbag deploying algorithm of a front/side airbag controller 20 are independently performed, the front/side airbag controller 20 may monitor sensed signal values of a front crash sensor.

For this, the front/side airbag controller may include a front signal monitor 22 monitoring a front acceleration signal that is a sensed signal value of the front crash sensor to determine whether or not the front acceleration signal exceeds a first threshold of speed according to time and a threshold adjuster that lowers a second threshold for deploying the side airbag when the front acceleration signal exceeds the first threshold of speed according to time.

The front signal monitor 22 of the front/side airbag controller 20 may receive in real-time the front acceleration signal that is the sensed signal value of the front crash sensor.

Then, the front signal monitor 22 may convert the front acceleration signal into a speed according to time, and may determine whether or not the speed Vx according to time exceeds the first threshold THD, i.e., threshold speed THD.

In this case, when the speed Vx according to time exceeds the first threshold THD according to time, the front signal monitor 22 may transmit a threshold adjustment request signal THsg informing the excess to the threshold adjuster 24.

Next, the threshold adjuster 24 of the front/side airbag controller 20 may lower the second threshold that is a threshold with respect to decision factors for deploying the side airbag.

Figure 5A:
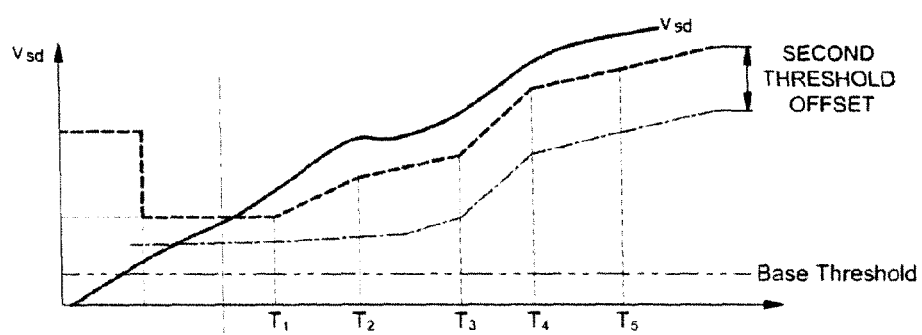
FIGS. 5A and 5B are graphs illustrating a side airbag deploying method for a vehicle according to an embodiment of the present disclosure.
Figure 5B:
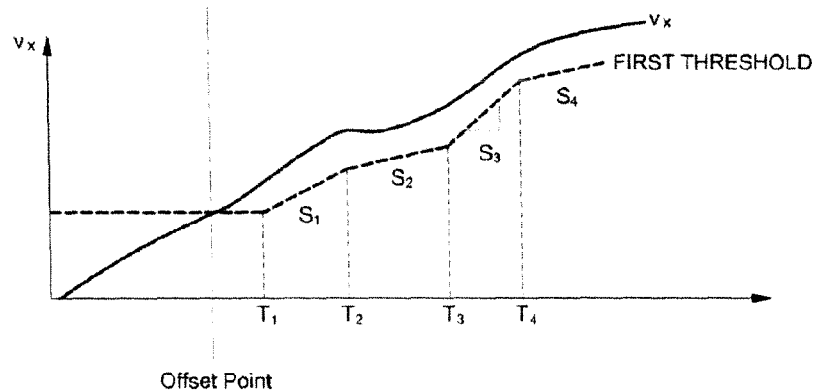

In concurrence with a point where the speed Vx according to time exceeds the predetermined first threshold THD according to time (see FIG. 5B), the threshold adjuster 24 of the front/side airbag controller 20 may lower the second threshold (speed) according to time with respect to the decision factors for the side airbag deploying algorithm to a certain level (e.g., the second threshold indicated as dotted line of FIG. 5A is offset to the level of chain line).

More specifically, offset control may be performed to lower the second threshold according to time with respect to a Y-direction acceleration sensed signal value ACU-Y by the front/side airbag controller 20, a sensed signal value SIS G-Y of the side crash sensor, and a sensed signal value SIS P-Y of the side pressure sensor, respectively.

In this case, the amount of offset that lowers the second threshold may be freely adjusted by values of parameters set by calibrating, but the second threshold may become minus according to the offset, or deploying may occur even in a situation where the side airbag is not deployed (e.g., front collision to flat wall).

Accordingly, the second threshold according to time may be allowed not to be lowered below a base threshold even though the second threshold with respect to the decision factors for the deploying of the side airbag, i.e., the second threshold according to time with respect to the Y-direction acceleration sensed signal value ACU-Y, the sensed signal value SIS G-Y of the side crash sensor, and the sensed signal value of the side pressure sensor SIS P-Y, by setting the base threshold (two-dot chain line of FIG. 5A) that defines the level to which the second threshold with respect to the decision factors for the deploying of the side airbag, is lowered.

Thus, mis-deploying of the side airbag can be prevented by setting the base threshold, and the side airbag can be prevented from being deployed in a situation where the side airbag need not inflate (e.g., front crash).

Meanwhile, although the speed Vx according to time converted from the front acceleration signal exceeds the first threshold THD, and thus, the second threshold with respect to the decision factors for deploying the side airbag is offset, when the speed Vx according to time becomes smaller than the first threshold THD, the second threshold may also increase to the original value again. In other words, the second threshold momentarily changes from a lower threshold to a higher threshold thereby returning to the original value.

Hereinafter, a process of deploying a side airbag according to an embodiment of the present disclosure will described in detail.

First, the front signal monitor 22 of the front/side airbag controller 20 may monitor the front acceleration signal, which is the sensed signal value of the front crash sensor, in real-time.

The front signal monitor 22 then may convert the front acceleration signal into the speed according to time, and may determine whether or not the speed Vx according to time exceeds the first threshold THD. In this case, when the speed Vx according to time exceeds the first threshold THD according to time, the front signal monitor 22 may transmit a threshold adjustment request signal THsg to inform the threshold adjuster 24.

Next, the threshold adjuster 24 of the front/side airbag controller 20 may perform offset control to lower the second threshold according to time with respect to a Y-direction acceleration sensed signal value ACU-Y by the front/side airbag controller 20, a sensed signal value SIS G-Y of the side crash sensor, and a sensed signal value SIS P-Y of the side pressure sensor, respectively.

When one decision factor (see G-SISD of FIG. 3) of the Y-direction acceleration sensed signal value ACU-Y, the sensed signal value SIS G-Y of the side crash sensor, and the sensed signal value SIS P-Y of the side pressure sensor is inputted, the front/side airbag controller 20 may convert the decision factor G-SISD into a speed value Vsd according to time.

Thereafter, the speed value Vsd (indicated as solid line in FIG. 5) according to time may be compared with the second threshold THsg that is lowered. When the speed value Vsd is greater than the second threshold THsg that is lowered, a known control process of deploying the side airbag may be performed to deploy the side airbag.

According to an embodiment of the present disclosure, a system and method for deploying a side airbag for a vehicle can prevent an injury of a passenger by monitoring a front acceleration sensing signal value upon front crash to lower a threshold for deploying of the side airbag. Thus, when both front airbag and side airbag need to be deployed upon local crashes of various angles and speeds, the side airbag can be deployed when a signal sensed by a side crash sensor or a side pressure sensor exceeds the lowered threshold even though the magnitude of the sensed signal is small.

Also, the deploying of the side airbag can be effectively controlled only by changing a control logic without a separate sensor and additional cost.

In addition, since the threshold of a decision factor for deploying the side airbag is interrupted from being lowered under a base threshold, unnecessary side airbag deploying upon front crash can be reduced, improving passenger safety and repair cost.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A system for deploying a side airbag of a vehicle, comprising a front and side airbag controller for controlling processes of deploying a front airbag and the side airbag independently, wherein the front and side airbag controller comprises:
a front signal monitor converting a front acceleration signal received from the airbag controller into a speed according to time and then determining whether or not the speed according to time exceeds a first threshold; and
a threshold adjuster receiving a threshold adjustment request signal from the front signal monitor to lower a second threshold that is a threshold with respect to decision factors for deploying the side airbag,
wherein the second threshold is lowered according to time with respect to a Y-direction acceleration sensed signal value, a sensed signal value of a side crash sensor, and a sensed signal value of a side pressure sensor which are the decision factors for deploying the side airbag.

2. A method for deploying a side airbag of a vehicle, comprising:
monitoring a front acceleration signal from a front crash;
determining whether or not to adjust a threshold of a decision factor for deploying the side airbag based on the front acceleration signal;
lowering the threshold of the decision factor when the threshold of the decision factor needs to be adjusted; and
converting the decision factor into a speed value according to time and then comparing the speed value with a second threshold to deploy the side airbag when the speed value exceeds the second threshold,
wherein the lowering of the threshold of the decision factor comprises lowering the second threshold according to time with respect to a Y-direction acceleration sensed signal value, a sensed signal value of a side crash sensor, and a sensed signal value of a side pressure sensor which are decision factors for deploying the side airbag.

3. The method of claim 2, wherein the determining of whether or not to adjust the threshold comprises converting the front acceleration signal into the speed according to time and then determining whether or not the speed according to time exceeds a predetermined threshold according to time.

4. The method of claim 3, wherein the determining of whether or not to adjust the threshold further comprises requesting a threshold adjustment request signal from a threshold adjuster when the speed according to time exceeds the predetermined threshold according to time.

5. The method of claim 2, wherein the lowering of the second threshold is controlled not to be lowered under a base threshold to prevent the side airbag from mis-deploying.

6. The method of claim 2, wherein the second threshold increases to an original value when the speed according to time again becomes smaller than a first threshold.

7. The method of claim 2, wherein the second threshold changes from a lower threshold to a higher threshold thereby returning to an original value.

8. A method for deploying a side airbag of a vehicle, comprising:

monitoring a front acceleration signal from a front crash;

determining whether or not to adjust a threshold of a decision factor for deploying the side airbag based on the front acceleration signal;

lowering the threshold of the decision factor when the threshold of the decision factor needs to be adjusted; and converting the decision factor into a speed value according to time and then comparing the speed value with a second threshold to deploy the side airbag when the speed value exceeds the second threshold, wherein the determining of whether or not to adjust the threshold comprises converting the front acceleration signal into the speed according to time and then determining whether or not the speed according to time exceeds a predetermined threshold according to time, wherein the determining of whether or not to adjust the threshold further comprises requesting a threshold adjustment request signal from a threshold adjuster when the speed according to time exceeds the predetermined threshold according to time, and wherein the lowering of the threshold of the decision factor comprises lowering the second threshold according to time with respect to a Y-direction acceleration sensed signal value, a sensed signal value of a side crash sensor, and a sensed signal value of a side pressure sensor which are decision factors for deploying the side airbag.

\* \* \* \* \*